United States Patent Office 2,777,852
Patented Jan. 15, 1957

2,777,852
2-LOWER-ALKYLSULFINYL-6-LOWER ALKOXY-BENZOTHIAZOLE

Norbert Steiger, Nutley, N. J., assignor to Hoffmann-La Roche Inc., Nutley, N. J., a corporation of New Jersey No Drawing. Application November 9, 1954,
Serial No. 467,890

3 Claims. (Cl. 260—306)

This invention relates to mercapto benzothiazole compounds and to the methods for producing them. More particularly, the invention relates to 2-α-haloalkylmercapto benzothiazoles bearing a basic ether group in the 6-position.

The compounds of this invention are represented by the following structural formula:

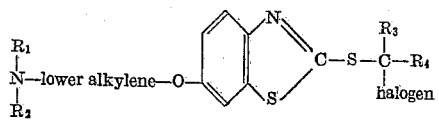

wherein $NR_1R_2$ represents a dilower alkylamino group or a heteromonocyclic radical having 5 to 6 atoms in the ring, $R_3$ represents hydrogen or a lower alkyl group, and $R_4$ represents hydrogen or a lower alkyl or aryl group.

The heteromonocyclic radicals represented by $NR_1R_2$ include saturated, nitrogen-containing heterocyclic groups such as piperidino, morpholino, pyrrolidino and the like. The term "lower alkylene" used in the above structural formula refers to straight chain and branched chain divalent lower aliphatic radicals, preferably those containing 1 to 5 carbon atoms in the chain. Aryl groups within the meaning of the above formula include monocyclic aromatic radicals such as phenyl, benzyl, and halogen-substituted phenyl or benzyl, etc.

Compounds corresponding to the structural formula defined above form acid addition salts and quaternary salts which are also included within the scope of this invention.

The compounds of this invention are useful as antifungal agents, more particularly they are useful as the active medicament in pharmaceutical formulations for treating the infections caused by the organisms *Trichophyton mentagrophytes* and *Microsporon lanosum*.

The new compounds are prepared according to the following illustrative general reaction scheme:

Acid addition salts of the bases formed according to the above method are produced by reacting the base with an inorganic or organic acid such as the mineral acids, including hydrochloric acid, hydrobromic acid, or toluenesulfonic acid, citric acid, tartaric acid, oxalic acid, etc. If desired, the acid addition salt may first be isolated and then converted to the base by dissolving the acid addition salt in a solvent such as water, neutralizing with a strong base, for example, sodium hydroxide, and extracting the base with ether or benzene. The base may be recovered from the solvent by distilling in vacuo. Quaternary salts are produced by reacting the base with a quaternizing agent such as alkyl halides, aralkyl halides, etc.

Example 1

105 grams (0.5 mol) of 2-mercapto-6-ethoxy-benzothiazole were dissolved in 100 cc. of 40% sodium hydroxide and 500 cc. of water. 60 cc. of dimethyl sulfate were dropped in with agitation at a temperature below 45° C. The mixture was heated for one hour at 70° C., then cooled to 20° C. The 2-methylmercapto-6-ethoxy-benzothiazole thus obtained was filtered and washed on the funnel with cold water. The material was dried overnight on the filter funnel.

204 grams (0.91 mol) of 2-methylmercapto-6-ethoxy-benzothiazole were refluxed with 2000 cc. of alcohol and 200 cc. of hydrogen peroxide (30%) for 8 hours. The mixture was chilled to 15°, then the 2-methylsulfinyl-6-ethoxy-benzothiazole was filtered and dried on the filter funnel.

162 grams of 2-methylsulfinyl-6-ethoxy-benzothiazole were added with stirring to 240 cc. of thionyl chloride below 15°. The mixture was stirred for 3 hours at room temperature and then drowned in ice. Crystalline 2-chloromethylmercapto-6-ethoxy-benzothiazole was thus obtained. The compound was stirred for 2 hours, filtered and washed acid free with cold water. The crystals were dried overnight. The compound was crystallized from 700 cc. of alcohol. The 2-chloromethylmercapto-6-ethoxy-benzothiazole melts at 108–110° C.

116 grams of 2-chloromethylmercapto-6-ethoxy-benzothiazole were dissolved in 600 cc. of sulfuric acid (94%) at below 15°. After stirring at room temperature for one hour, the mixture was heated in a water bath at 50° for one hour and left standing overnight. The mixture was then trickled by dropping funnel into a battery jar containing ice and water. The solid white precipitate which formed was filtered and washed with ice water.

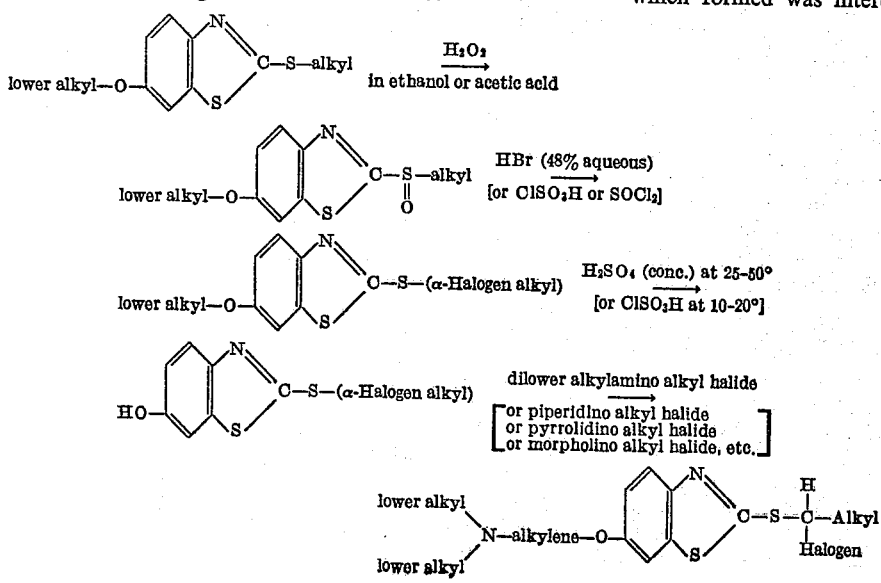

The filter cake was dissolved at 50° in 60 cc. of sodium hydroxide and 1500 cc. of water. The mixture was filtered through a diatomaceous earth coated funnel. The filtrate was acidified with 45 cc. of acetic acid. The precipitate which formed was filtered and washed twice with ice water. The 2 - chloromethylmercapto - 6 - hydroxy-benzothiazole was dried on the filter funnel and finally dried in the oven, M. P. 117–119° C.

In a 2-liter, 3-necked flask there were charged 102 grams of 2-chloromethylmercapto-6-hydroxy-benzothiazole, 800 cc. of chlorobenzene, 140 cc. of methanol and 34 grams of sodium methoxide. The methanol was distilled off and 75 cc. of β-diethylaminoethyl chloride and 70 cc. of chlorobenzene were added at 100°. The mixture was refluxed for 4 hours. 500 cc. of water and 25 cc. of sodium hydroxide were then added. The layers which formed were separated and the chlorobenzene layer, after drying over sodium sulfate, was concentrated in vacuo. The 2 - chloromethylmercapto - 6 - (β-diethylaminoethoxy)benzothiazole thus obtained was dissolved in 600 cc. of ether, filtered, chilled to −10° and precipitated with 70 cc. of ethanol-HCl (35%). The precipitate was filtered, washed with ether, and dried over sodium hydroxide in a desiccator. The 2-chloromethylmercapto-6-(β-diethylaminoethoxy)benzothiazole hydrochloride was recrystallized from acetone-alcohol, M. P. 162° C.

37 grams of 2 - chloromethylmercapto - 6 - (β-diethylaminoethoxy)benzothiazole hydrochloride were dissolved in 500 cc. of water at 50°. The clear solution was chilled to 10–15° and 105 cc. of N sodium hydroxide solution were added. The free base precipitated as an oil which crystallized upon standing in the refrigerator. The white crystals thus obtained were filtered and washed with ice water. The crystals were then dried in the desiccator over sodium hydroxide, M. P. 53° C.

6 grams of the base obtained in the preceding paragraph were dissolved in 70 cc. of acetone. To this solution was added a solution of 4.2 grams of citric acid in 10 cc. of alcohol. The 2-chloromethylmercapto-6-(β-diethylaminoethoxy)benzothiazole citrate which crystallized was filtered, washed with acetone and recrystallized from alcohol-acetone, M. P. 150° C.

*Example 2*

113 grams (0.47 mol) of 2-mercapto-6-ethoxy-benzothiazole were stirred in a 2-liter, 3-necked flask in a solution of 500 cc. of water and 100 cc. of sodium hydroxide (40%). 76 grams of ethyl bromide dissolved in 100 cc. of alcohol were trickled into the water solution. The mixture was heated to 50° until it showed a negative test to lead acetate. The alcohol was then distilled off at 80–85°. The mixture was then chilled to 20°, whereupon 2-ethylmercapto-6-ethoxy-benzothiazole crystallized. The crystals were filtered, washed with water and dried on the funnel by suction.

125 grams of 2-ethylmercapto-6-ethoxy-benzothiazole were refluxed in a 3-liter, 3-necked flask with 1000 cc. of alcohol and 150 cc. of hydrogen peroxide (30%) for 8 hours. About two-thirds of the alcohol were distilled off in vacuo. The concentrate was diluted with 6 to 7 liters of ice water to obtain a crystalline precipitate. The 2-ethylsulfinyl-6-ethoxy-benzothiazole was filtered, dried on the funnel and then recrystallized from 500 cc. of an n-heptane hydrocarbon fraction.

115 grams (0.45 mol) of 2-ethylsulfinyl-6-ethoxy-benzothiazole were added to 125 cc. of thionyl chloride in a 1-liter, 3-necked flask while cooling below 15°. The mixture was stirred for 2 hours at room temperature, then drowned in ice and water. 2-(α-chloroethylmercapto)-6-ethoxy-benzothiazole crystallized out. The crystals were filtered, washed with ice water, dried on the funnel, then recrystallized from 250 cc. of alcohol, M. P. 62–64° C.

45 grams of 2 -(α - chloroethylmercapto) - 6 - ethoxy-benzothiazole were added at 5–10° to 200 cc. of chlorosulfonic acid in a 3-necked flask. The mixture was stirred for 2 hours at 20° and then drowned by dropping into ice and water from a dropping funnel. After standing overnight the crystalline compound which formed was filtered and washed with ice water. The crude product was dissolved at 50° in 50 cc. of sodium hydroxide (40%), and 1300 cc. of water and filtered. The filtrate was cooled to 20° and acidified with 40 cc. of acetic acid. The crystalline precipitate, 2-(α-chloroethylmercapto)-6-hydroxy-benzothiazole, was filtered, washed with ice water and dried in an oven at 75°, M. P. 126–128° C.

35 grams (0.143 mol) of 2-(α-chloroethylmercapto)-6-hydroxy-benzothiazole, 350 cc. of chlorobenzene, 12 grams of sodium methoxide and 50 cc. of methanol were stirred in a 3-necked flask. The methanol was then distilled off and distillation was continued until the temperature reached 130°. 25 cc. of diethylaminoethyl chloride were added at 100° and the mixture was refluxed at 130° for 4 hours. Then 10 cc. of sodium hydroxide (40%) and 250 cc. of water were added at 100°. The mixture was stirred for one-half hour and the layers which formed upon standing were separated in a separatory funnel. The chlorobenzene layer, after drying over sodium sulfate, was concentrated in vacuo. 2-(α-chloroethylmercapto) - 6 - (β - diethylaminoethoxy)benzothiazole was thus obtained as an oil.

The oil obtained above was dissolved in 300 cc. of ether and filtered. The filtered ether solution was chilled to −10° and 30 cc. of ethanol-HCl (35%) was added. 2-(α - chloroethylmercapto) - 6 - (β - diethylaminoethoxy)benzothiazole hydrochloride precipitated as a white crystalline powder which was filtered on a fritted funnel and dried in a desiccator. The product was recrystallized from 500 cc. of acetone and 120 cc. of alcohol, M. P. 170–171° C.

*Example 3*

25 grams (0.1 mol) of 2-(α-chloroethylmercapto)-6-hydroxy-benzothiazole were suspended in 350 cc. of chlorobenzene. 8 grams of sodium methoxide and 100 cc. of methanol were then added and the mixture was distilled until the temperature reached 131°. After cooling to room temperature, 150 cc. of chlorobenzene and 19 grams of freshly prepared dimethylaminoisopropyl chloride were added. The reaction mixture was refluxed at 131° for 3½ hours, then cooled to 85°. 20 cc. of 40% sodium hydroxide in 150 cc. of water were slowly added. After one-half hour of stirring, the mixture was permitted to settle and the chlorobenzene phase was separated then dried with sodium sulfate. On removal of the solvent by vacuum distillation on a steam bath, the oily base, 2-(1-chloroethylmercapto)-6-(2-dimethylaminoisopropoxy)benzothiazole, was purified by high vacuum distillation, B. P. 178–181° C. at 0.01 mm. of Hg.

The base was converted to the hydrochloride by dissolving it in ethyl acetate, adding ethanol-HCl while cooling, then diluting it with ether. The hydrochloride melted at 168–170° C. upon recrystallization from ethyl acetate-ethanol.

*Example 4*

25 grams (0.1 mol) of 2-(α-chloroethylmercapto)-6-hydroxy-benzothiazole were suspended in 350 cc. of chlorobenzene. 8 grams (0.15 mol) of sodium methylate, followed by 100 cc. of methanol, were added. The mixture was distilled until the temperature reached 132°, then allowed to cool to 50°. 22 grams (0.15 mol) of freshly prepared β-(N-piperidyl)ethyl chloride were added and the reaction mixture was refluxed at 132° for 3½ hours. After cooling to 80°, 20 cc. of 40% sodium hydroxide in 150 cc. of water were slowly added and the mixture was stirred for one-half hour. After settling, the chlorobenzene phase was separated and dried with sodium sulfate. The solvent was removed by vacuum distillation on a steam bath and the 2-(1-chloroethylmercapto)-6-[2-(1-piperidyl)ethoxy]benzothiazole was purified by distillation in vacuo, B. P. 205–213° C. at 0.02 mm. of Hg.

The hydrochloride was prepared by dissolving the base in ethyl acetate cooling, adding ethanolic hydrochloric acid and diluting with ether, M. P. 165–168° C.

Example 5

25 grams (0.1 mol) of 2-(α-chloroethylmercapto)-6-hydroxy-benzothiazole were suspended in 350 cc. of chlorobenzene. 8 grams of sodium methylate and 100 cc. of methanol were added. The mixture was distilled until the temperature reached 132° and then permitted to cool to room temperature. 100 cc. of chlorobenzene and 20 grams (0.15 mol) of freshly prepared β-(N-pyrrolidino)-ethyl chloride were added. The mixture was refluxed at 132° for 3½ hours. After cooling to 80°, a solution of 20 cc. of 40% sodium hydroxide in 150 cc. of water was added and the mixture was stirred for one-half hour. The chlorobenzene layer which formed upon standing was separated and dried with sodium sulfate. The solvent was removed by vacuum distillation on a stream bath to obtain the oily base, 2-(1-chloroethylmercapto)-6-[2-(1-pyrrolidyl)ethoxy]-benzothiazole.

The oily base obtained above was converted to the hydrochloride by dissolving it in ether and treating with gaseous hydrogen chloride. The hydrochloride melted at 183–185° C. upon recrystallization from ethyl acetate-ethanol-ether.

Example 6

25 grams (0.1 mol) of 2-(α-chloroethylmercapto)-6-hydroxy-benzothiazole were suspended in 350 cc. of chlorobenzene. 8 grams of sodium methoxide and 100 cc. of methanol were added, the mixture was distilled until the temperature reached 131° and was then permitted to cool to 50°. 150 cc. of chlorobenzene were added, followed by 21 grams (0.14 mol) of freshly prepared 3-chloropropyl-N-diethylamine. The reaction mixture was refluxed at 132° for 3½ hours. After cooling to 85°, a solution of 20 cc. of 40% sodium hydroxide in 150 cc. of water was slowly added and the mixture was stirred for one-half hour. After settling, the reaction mixture was transferred to a separatory funnel and the chlorobenzene layer was drawn off. The chlorobenzene layer was dried with sodium sulfate for 3 hours. The filtered solution was concentrated in vacuo on a steam bath to obtain an oil which was then distilled in high vacuum to give the free base, 2-(1-chloroethylmercapto)-6-(3-diethylaminopropoxy)benzothiazole, B. P. 186–190° C. at 0.01 mm. of Hg.

The hydrochloride of the base obtained above was produced by dissolving 25 grams (0.070 mol) of the base in 200 cc. of ethyl acetate. To the cooled solution 20 cc. of a 35% solution of hydrogen chloride gas in ethanol were slowly added, followed by 75 cc. of ethanol. On dilution with 100 cc. of ether, the hydrochloride precipitated. Upon recrystallization from ethyl acetate-ethanol, the hydrochloride melted at 143–145° C.

Example 7

91 grams of 2-ethylsulfinyl-6-ethoxy-benzothiazole were stirred in a 3-necked flask with 300 cc. of 48% hydrogen bromide at 93–95° for 8 hours. The mixture was chilled to 10° and the crystalline precipitate which formed was filter on a fritted glass funnel. The filter cake was sludged with 500 cc. of water, stirred for one hour and filtered. The filter cake was then crystallized from a mixture of 500 cc. of alcohol and 50 cc. of water. The crystals obtained were heated and stirred with 250 cc. of 48% hydrogen bromide for 6 hours in a 3-necked flask equipped with a reflux condenser. The contacts of the flask were diluted with 300 cc. of salt water (30%) at 20°, filtered and washed with salt water. The filter cake was dissolved in 1500 cc. of water and 50 cc. of sodium hydroxide at 70°. The solution was filtered from alkali-insoluble material which was present. The filtrate was acidified with acetic acid at 20°. 2-(α-bromethylmercapto)-6-hydroxybenzothiazole precipitated as while crystals. The product was filtered and dried at 75°.

44 grams of 2-(α-bromoethylmercapto)-6-hydroxybenzothiazole, 500 cc. of chlorobenzene, 16 grams of sodium methoxide and 60 cc. of methanol were heated in a 3-necked flask for one hour at 65 to 70°. The methanol was then distilled off until the temperature in the flask reached 130°. 45 grams of β-diethylaminoethyl chloride were added at 100° and the mixture was refluxed with stirring for 4 hours at 130°. The mixture was diluted with 300 cc. of water and 10 cc. of 40% sodium hydroxide below 100°. After settling, the chlorobenzene layer was separated, dried with sodium sulfate and concentrated in vacuo. 2-(α-bromoethylmercapto)-6-(β-diethylaminoethoxy)benzothiazole was collected as an oil. The oil obtained above was dissolved in 300 cc. of ether. The solution was chilled to 0° and precipitated with 50 cc. of ethanol-HCl (35%). The white crystalline 2-(α-bromoethylmercapto) - 6 - (β - diethylaminoethoxy)benzothiazole hydrochloride was filtered, dried and recrystallized from alcohol-acetone, M. P. 162–163° C.

Example 8

4 grams of 2-(chloromethylmercapto)-6-(β-diethylaminoethoxy)benzothiazole (prepared according to the procedure described in Example 1) were dissolved in 25 cc. of acetone. To the solution were added 6 cc. of a 30% solution of methyl bromide in acetone at 15°. Off-white crystals of 2-chloromethylmercapto-6-(β-diethylaminoethoxy(benzothiazole-methyl bromide, M. P. 175° C., crystallized upon standing overnight in the refrigerator.

Example 9

105 grams (0.5 mol) of 2-mercapto-6-ethoxy-benzothiazole, 500 cc. of water and 100 cc. of sodium hydroxide were stirred together. 65 cc. of isopropyl bromide in 250 cc. of alcohol were added and the mixture was heated one hour at reflux temperature. The alcohol was distilled off. 2-isopropylmercapto-6-ethoxy-benzothiazole separated as an oil.

The oily product obtained above was dissolved in 1000 cc. of alcohol. 115 cc. of hydrogen peroxide (30%) were added and the mixture was refluxed for 8 hours. The reaction mixture was then concentrated in vacuo to one-half its volume and the concentrate was poured into 7000 cc. of ice water. The 2-isopropylsulfinyl-6-ethoxy-benzothiazole which crystallized out was then filtered, dried at room temperature and recrystallized from 600 cc. of an n-heptane hydrocarbon fraction.

106 grams of 2-isopropylsulfinyl-6-ethoxy-benzothiazole were dissolved in 170 cc. of thionyl chloride at 10–20° and the mixture was stirred 1½ hours at room temperature. The mixture was drowned in ice and water, stirred one hour and the solid was then filtered off. The filter cake was dissolved in 200 cc. of alcohol at 70 to 75°. The solution was cooled in a refrigerator, whereupon 2 - (α - chloroisopropylmercapto) - 6 - ethoxybenzothiazole crystallized, M. P. 54° C.

81.5 grams of 2-(α-chloroisopropylmercapto)-6-ethoxybenzothiazole were dissolved in 500 cc. of sulfuric acid (94%) at 5 to 15°. The solution was stirred first at room temperature for 2 hours, then at 50° for 3 hours. After standing overnight at room temperature, the solution was poured into ice and water. Crude 2-(α-chloroisopropylmercapto)-6-hydroxy-benzothiazole precipitated as a semi-solid mass. The crude product was decanted, dissolved in 60 cc. of sodium hydroxide and 2000 cc. of water at 50°, then filtered. The filtrate was acidified with 50 cc. of acetic acid. Purified 2-(α-chloroisopropylmercapto)-6-hydroxy-benzothiazole settled as a heavy oil.

The oil was decanted, dissolved in 400 cc. of alcohol and concentrated in vacuo.

57 grams of 2-(α-chloroisopropylmercapto)-6-hydroxy-benzothiazole were dissolved in 100 cc. of methanol and 500 cc. of chlorobenzene. 16 grams of sodium methoxide were added. The mixture was stirred and heated, then the methanol was distilled off. 40 cc. of β-diethylaminoethyl chloride were added at 100° and the mixture was refluxed for 4 hours. 400 cc. of water and 15 cc. of sodium hydroxide were added at 100° and stirred for one-half hour. After settling, the chlorobenzene layer was separated and concentrated in vacuo to obtain 2-(α-chloroisopropylmercapto) - 6 - (β - diethylaminoethoxy)-benzothiazole.

The base thus obtained was dissolved in 600 cc. of ether and precipitated at —5° with 70 cc. of ethanol-HCl (35%). The 2 - (α - chloroisopropylmercapto)-6-(β-diethylaminoethoxy)benzothiazole hydrochloride was filtered on a fritted funnel, dried in a desiccator with sodium hydroxide and then recrystallized from acetone-alcohol, M. P. 164–166° C.

Example 10

105 grams (0.5 mol) of 2-mercapto-6-ethoxy-benzothiazole were dissolved in 500 cc. of water and 100 cc. of sodium hydroxide (40%). The solution was heated with 80 grams of n-butyl bromide dissolved in 200 cc. of alcohol for one hour at reflux temperature (80°). The alcohol was distilled off and 2-n-butylmercapto-6-ethoxy-benzothiazole separated as an oil. 127 grams of the thio-ether thus obtained were refluxed for 8 hours with 1000 cc. of alcohol and 150 cc. of hydrogen peroxide (30%). The alcoholic solution was then concentrated in vacuo to one-half its volume. The concentrate was poured into 6000 cc. of ice water. Crude 2-n-butylsulfinyl-6-ethoxy-benzothiazole precipitated in crystalline form. The crystals were filtered, dried on the funnel and recrystallized from 500 cc. of an n-heptane hydrocarbon fraction. The melting point of the pure product was 64–67° C.

76 grams of 2-n-butylsulfinyl-6-ethoxy-benzothiazole were dissolved in 100 cc. of thionyl chloride below 15° with stirring and cooling. The solution was stirred for 2 hours at room temperature. The reaction mixture was poured onto ice and water and 2-(α-chlorobutylmercapto)-6-ethoxy-benzothiazole separated as an oily mass.

The above obtained mixture was decanted and the oil was dissolved in benzene. The benzene solution was concentrated in vacuo, then the oily concentrate was dropped onto 300 cc. of chlorosulfonic acid below 10°. The mixture was stirred for 3 hours at room temperature, then drowned in ice. 2-(α-chlorobutylmercapto)-6-hydroxy-benzothiazole was obtained as a solid. The mother liquor was decanted off and the solid was dissolved in alcohol. The alcohol solution was filtered, then concentrated in vacuo leaving an oily residue.

The oil was dissolved at 50° in 200 cc. of methanol and 450 cc. of chlorobenzene. 15 grams of sodium methoxide were added and the mixture was heated with agitation to 130°, allowing the methanol to distill off. 30 grams of β-diethylaminoethyl chloride were added at a temperature below 100° and then the reaction mixture was heated in a reflux condenser for 4 hours at 131°. After cooling to 100°, 300 cc. of water and 10 cc. of sodium hydroxide (40%) were added and the mixture was stirred for one-half hour. The chlorobenzene layer which formed on standing was then separated, dried over sodium sulfate and concentrated in vacuo.

The oily 2-(α-chlorobutylmercapto)-6-(β-diethylaminoethoxy)benzothiazole thus obtained as the concentrate was dissolved in 300 cc. of ether, filtered and diluted with ether to a volume of 500 cc. The ether solution was chilled to —5° and 25 cc. of ethanol-HCl (35%) were added. The precipitate which formed was filtered, dried in vacuo at 40° and then recrystallized from 500 cc. of acetone and 50 cc. of alcohol. The 2-(α-chlorobutylmercapto)-6-(β-diethylaminoethoxy)benzothiazole hydrochloride melted at 157–159° C.

Example 11

70 grams of 2-mercapto-6-ethoxy-benzothiazole, 300 cc. of water, 60 cc. of sodium hydroxide (40%), 60 grams of n-hexyl bromide and 200 cc. of alcohol were refluxed for one hour. The alcohol was distilled off. The residue was diluted with 300 cc. of water and 2-hexylmercapto-6-ethoxy-benzothiazole separated as an oil.

90 grams of 2-hexylmercapto-6-ethoxy-benzothiazole were dissolved in 800 cc. of alcohol. 90 cc. of hydrogen peroxide (30%) were added and the solution was heated at reflux temperature for 8 hours. The solution was then concentrated in vacuo to one-half its volume. The concentrate was poured into 4 liters of ice water. 2-hexylsulfinyl-6-ethoxy-benzothiazole crystallized upon standing overnight in a refrigerator. The crystals were filtered, dried on the funnel, dried in a desiccator over sulfuric acid and then recrystallized from an n-hexane hydrocarbon fraction M. P. 77–78° C.

88 grams of 2-hexylsulfinyl-6-ethoxy-benzothiazole were added to 125 cc. of thionyl chloride at a temperature below 20°. The solution was stirred for 2 hours at 15 to 20°, then drowned in ice and water. The precipitate which formed was dissolved in 200 cc. of alcohol at 75 to 80°. Upon standing in the refrigerator, 2-(α-chlorohexylmercapto)-6-ethoxy-benzothiazole crystallized, M. P. 50° C.

50 grams of 2-(α-chlorohexylmercapto)-6-ethoxy-benzothiazole were dissolved in 200 cc. of concentrated sulfuric acid at a temperature below 25°. The solution was heated for 4 hours at 45 to 50°, then slowly drowned in ice and water. The white precipitate which formed was filtered and purified by dissolving the filter cake in 500 cc. of water and 25 cc. of sodium hydroxide (40%) at room temperature. The solution was filtered and the filtrate was acidified with HCl. Crystalline 2-(α-chlorohexylmercapto) - 6 - hydroxy-benzothiazole precipitated. The precipitate was filtered and dried, M. P. 85° C.

27 grams of 2-(α-chlorohexylmercapto)-6-hydroxy-benzothiazole, 350 cc. of chlorobenzene, 8 grams of sodium methoxide and 50 cc. of methanol were stirred while heating. The methanol was then distilled off until the temperature of 130° was reached. 20 grams of β-diethylaminoethyl chloride were added at a temperature below 100°. The reaction mixture was refluxed for 4 hours at 130°, then cooled to 100°, and diluted with 300 cc. of water and 10 cc. of sodium hydroxide. After settling, the chlorobenzene layer was separated and concentrated in vacuo to obtain 2-(α-chlorohexylmercapto)-6-(β-diethylaminoethoxy)benzothiazole as an oil.

The oil thus obtained was dissolved in ether and treated with ethanol-HCl. The crude 2-(α-chlorohexylmercapto) - 6 - (β-diethylaminoethoxy)benzothiazole hydrochloride precipitated and the white crystals thus obtained were recrystallized from 30 cc. of ethanol and 300 cc. of acetone, M. P. 143° C.

Example 12

225 grams of 2-mercapto-6-ethoxy-benzothiazole were dissolved in 100 cc. of water and 200 cc. of sodium hydroxide (40%) at room temperature. To this solution were added 205 grams of p-chlorobenzyl chloride and 400 cc. of alcohol. The mixture was heated with agitation for one hour at reflux temperature. The alcohol was distilled off and the residue was diluted with one liter of ice water and stirred for one hour. The crystalline 2-(p-chlorobenzylmercapto)-6-ethoxy-benzothiazole which formed was filtered, washed with water and dried, M. P. 68 to 70° C.

163 grams of 2-(p-chlorobenzylmercapto)-6-ethoxy-benzothiazole were refluxed with 1000 cc. of alcohol and 150 cc. of hydrogen peroxide for 8 hours. After 24 hours, 2-(p-chlorobenzylsulfinyl)-6-ethoxy-benzothiazole crystallized and was filtered off, M. P. 168–169° C.

141 grams of 2-(p-chlorobenzylsulfinyl)-6-ethoxy-benzothiazole were dissolved in 250 cc. of thionyl chloride at 20°. The solution was stirred for 2 hours at 20 to 25°, then drowned in ice and water. This mixture was stirred for 4 hours. 2-[(α-chloro) - p - chlorobenzylmercapto]-6-ethoxy-benzothiazole which precipitated was filtered off and dried. The dry compound thus obtained was dissolved in 500 cc. of sulfuric acid (95%) at 20–25°. The solution was heated at 55° for one hour, then poured onto ice. The 2-[(α-chloro)-p-chlorobenzylmercapto] - 6-hydroxy-benzothiazole which precipitated was filtered. Upon drying, the product was obtained as a white powder.

100 grams of 2-[(α-chloro)-p-chlorobenzylmercapto]-6-hydroxy-benzothiazole were condensed with 70 grams of β-diethylaminoethyl chloride according to the procedure described in Example 1. 2-[(α-chloro)-p-chlorobenzylmercapto] - 6-(β-diethylaminoethoxy)benzothiazole was obtained as an oil.

The oily base obtained above was dissolved in 500 cc. of ether and treated with ethanol-HCl. The 2-[(α-chloro)-p-chlorobenzylmercapto] - 6 - (β-diethylaminoethoxy)benzothiazole hydrochloride which precipitated was recrystallized from ethanol-acetone and was obtained as white crystals, M. P. 236° C.

I claim:
1. 2-lower alkylsulfinyl-6-lower alkoxy-benzothiazole.
2. 2-methylsulfinyl-6-ethoxy-benzothiazole.
3. 2-ethylsulfinyl-6-ethoxy-benzothiazole.

References Cited in the file of this patent

UNITED STATES PATENTS

| | | |
|---|---|---|
| 1,847,514 | Herz et al. | Mar. 1, 1932 |
| 2,092,712 | Clifford | Sept. 7, 1937 |

OTHER REFERENCES

Taniyama, Chem. Abst., vol. 45, col. 9530 (1951).
Grunberg et al., Chem. Abst., vol. 47, col. 8816 (1953).